United States Patent
Lim et al.

(10) Patent No.: US 9,720,069 B2
(45) Date of Patent: Aug. 1, 2017

(54) APPARATUS AND METHOD FOR MEASURING LOCATION OF USER EQUIPMENT LOCATED INDOORS IN WIRELESS NETWORK

(71) Applicants: LG ELECTRONICS INC., Seoul (KR); UNIVERSITY-INDUSTRY COOPERATION GROUP OF KYUNGHEE UNIVERSITY, Yongin-si, Gyeonggi do (KR)

(72) Inventors: Dongguk Lim, Anyang-si (KR); Hyundong Shin, Suwon-si (KR); Youngmin Jeong, Paju-si (KR); Hangyu Cho, Seoul (KR)

(73) Assignees: LG ELECTRONICS INC., Seoul (KR); UNIVERSITY-INDUSTRY COOPERATION GROUP OF KYUNGHEE UNIVERSITY, Yongin-si (KR)

( * ) Notice: Subject to any disclaimer, the term of this patent is extended or adjusted under 35 U.S.C. 154(b) by 246 days.

(21) Appl. No.: 14/050,809

(22) Filed: Oct. 10, 2013

(65) Prior Publication Data
US 2014/0099971 A1    Apr. 10, 2014

Related U.S. Application Data (60) Provisional application No. 61/712,215, filed on Oct. 10, 2012.

(51) Int. Cl.
G01S 5/00 (2006.01)
G01S 5/02 (2010.01)

(52) U.S. Cl.
CPC .......... *G01S 5/0027* (2013.01); *G01S 5/0263* (2013.01); *G01S 5/0273* (2013.01); *G01S 5/0252* (2013.01)

(58) Field of Classification Search
CPC .......... G06F 19/3437; G06F 17/30038; G06F 17/30041; G06F 17/30044; G06F 17/30241; G06F 17/30268; G06F 17/30386; G06F 17/3053; G06F 17/30598; G06F 17/30864; G06F 17/3087; G06F 17/5009; G06F 17/5045; G06F 19/24; G06F 19/345;
(Continued)

(56) References Cited

U.S. PATENT DOCUMENTS

2005/0050087 A1* 3/2005 Milenova et al. ............ 707/102
2009/0069029 A1* 3/2009 Guvenc .................. H04W 64/00
                                                  455/456.1
2010/0070435 A1* 3/2010 Candela et al. ................ 706/12
(Continued)

*Primary Examiner* — Marsha D. Banks Harold
*Assistant Examiner* — Natasha W Cosme
(74) *Attorney, Agent, or Firm* — Birch, Stewart, Kolasch & Birch, LLP (57) ABSTRACT

A method of measuring a location of a user equipment (UE) located indoors in a wireless network includes receiving signals from a plurality of access points (APs), performing training for machine learning using the received signals or information acquired from the received signals, setting a weight vector to be applied to a relevance vector machine (RVM) method using data subjected to the training for machine learning, and applying RVM regression to the set weight vector and measured strengths of the received signals and determining whether the signals received from the plurality of APs are line of sight (LOS) signals or non line of sight (NLOS) signals.

10 Claims, 7 Drawing Sheets

(58) Field of Classification Search
CPC .... G01S 5/0027; G01S 5/0252; G01S 5/0263; G01S 5/0273
USPC .......................................... 455/456.1, 67.11
See application file for complete search history.

(56) References Cited

U.S. PATENT DOCUMENTS

2010/0315289 A1* 12/2010 Nurmela ................ H04B 17/27
                                                         342/385
2011/0177786 A1*  7/2011 Marano et al. ............ 455/67.11

* cited by examiner

| Linear SVM |
| --- |
| ○ Linearly separable |
| ○ Circled points: support vectors |
| ○ Maximize margin ρ |

| Nonlinear SVM |
| --- |
| ○ Not linearly separable |
| ○ Soft margin classification |
| ○ Add slack variable $\xi_i$ |

APPARATUS AND METHOD FOR MEASURING LOCATION OF USER EQUIPMENT LOCATED INDOORS IN WIRELESS NETWORK

CROSS-REFERENCE TO RELATED APPLICATION

This application claims the benefit of U.S. Provisional Application Ser. No. 61/712,215, filed on Oct. 10, 2012, which is hereby incorporated by reference as if fully set forth herein.

BACKGROUND OF THE INVENTION

Field of the Invention

The present invention relates to location measurement in wireless communication, and more particularly, to a method of estimating a location of a user equipment (UE) if the UE is located indoors in a wireless network.

Discussion of the Related Art

An assisted global positioning system (A-GPS) is a satellite-based positioning system that can under certain conditions (mostly, when a data link with a server is established) improve a GPS startup speed and reduce time to first fix (TTTF) (which is a time taken to fix a data link with an artificial satellite). An A-GPS is mainly used in a user equipment (UE) (e.g., a cellular phone or a smart phone) having a built-in GPS and was developed by Federal Communications Commission in order to transmit location information during 911 emergency calls.

A UE can support location information to a user via A-GPS technologies. A-GPS technologies are location information service technologies that are mainly used in 3rd generation partnership project (3GPP) standard and currently provide many services to subscribers. In simpler terms, the UE receives GPS (which corresponds to A-GNSS in terms of 3GPP) satellite information and transmits or receives location related information of a base station (BS) based on the GPS satellite information to receive accurate location information through a server that manages location information of the BS.

A-GPS technologies have been already used to provide more accurate location information using information received by a UE from a GPS via communication with a server that manages location information of a BS. Recently, A-GPS technologies have been mainly used in fields of wideband code division multiple access (WCDMA) of 3GPP standard or code division multiple access (CDMA) of 3GPP2 standard. In areas where UEs cannot easily receive location information, locations are estimated using satellite information alone, which is disadvantageously less accurate than A-GPS technologies. In addition, time required to acquire location information may be changed according to an area.

From the Cold War with the Soviet Union, the United States launched many artificial satellites out of the earth in order to spy upon the Soviet Union. These satellites periodically transmit location information to the earth at a specific frequency. When a UE receives location information to estimate a location, errors corresponding to several hundred meters may be experienced. Accordingly, for more accurate estimation and error reduction, a UE accesses a location information server of a BS using information received from a GPS to obtain a more accurate location, which is called A-GPS technologies. In general, an error range is reduced within several meters even if accuracy is changed according to a location of a UE within an area managed by a BS.

However, according to these technologies, problems arise in terms of location acquisition when a UE fails to receive GPS signals. Of course, when the UE is located in a building, the UE can receive GPS signals through antennas installed outdoors. However, currently, this reception is significantly limited, and thus, many problems arise in areas where GPS signals cannot be received, such as indoors or underground. In this case, it is very difficult to acquire accurate location information by the UE in reality. In this regard, detailed solutions to these problems have not yet been to be proposed.

In addition, if three or more APs cannot be detected indoors, it is impossible to measure a location of a UE using a method other than a GPS method. The present invention proposes a method for solving such problems.

SUMMARY OF THE INVENTION

Accordingly, the present invention is directed to an apparatus and method for measuring a location of a user equipment (UE) located indoors in a wireless network that substantially obviates one or more problems due to limitations and disadvantages of the related art.

An object of the present invention is to provide a method of measuring a location of a UE located indoors in a wireless network.

Another object of the present invention is to provide an apparatus for measuring a location of a UE located indoors in a wireless network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of measuring a location of a user equipment (UE) located indoors in a wireless network includes receiving signals from a plurality of access points (APs), performing training for machine learning using the received signals or information acquired from the received signals, setting a weight vector to be applied to a relevance vector machine (RVM) method using data subjected to the training for machine learning, and applying RVM regression to the set weight vector and measured strengths of the received signals and determining whether the signals received from the plurality of APs are line of sight (LOS) signals or non line of sight (NLOS) signals. The method may further include measuring the indoor location of the UE using only a signal of an AP determined as an LOS signal or applying a weight to a signal of an AP determined as an NLOS signal and then measuring the indoor location of the UE using the LNOS signal, to which the weight is applied, and a signal of an AP determined as an LOS signal. The information acquired from the received signals may include at least one of received signal energy, mean excess delay, root-mean-square (RMS) delay spread (RDS), maximum amplitudes of the received signals, Kurtosis of the received signals and received signal strength indication (RSSI). If the weight is applied to the signal of the AP determined as the NLOS signal, the weight may be applied to mitigate a component of the NLOS signal. The plurality of APs may include three or more APs.

In another aspect of the present invention, an apparatus for measuring a location of a user equipment (UE) located indoors in a wireless network includes a mobile communication module configured to receive signals from a plurality of access points (APs), and a location information module configured to perform training for machine learning using the received signals or information acquired from the received signals, to set a weight vector to be applied to a relevance vector machine (RVM) method using data subjected to the training for machine learning, and to apply RVM regression to the set weight vector and measured strengths of the received signals and determining whether the signals received from the plurality of APs are line of sight (LOS) signals or non line of sight (NLOS) signals. The location information module may be configured to measure the indoor location of the UE using only a signal of an AP determined as an LOS signal or to apply a weight to a signal of an AP determined as an NLOS signal and to measure the indoor location of the UE using the LNOS signal, to which the weight is applied, and a signal of an AP determined as an LOS signal. The information acquired from the received signals may include at least one of received signal energy, mean excess delay, RMS delay spread (RDS), maximum amplitudes of the received signals, Kurtosis of the received signals and received signal strength indication (RSSI). If the weight is applied to the signal of the AP determined as the NLOS signal, the location information module may be configured to apply the weight to mitigate a component of the NLOS signal. The plurality of APs may include three or more APs.

In a location measurement method according to the present invention, a method of mitigating an NLOS signal influencing localization by applying data measured by a UE for localization to an RVM regressor and an inter-UE cooperative localization method using the RVM regressor are utilized, thereby further improving indoor localization accuracy of the UE.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description focuses upon a case in which a mobile communication system is a 3rd generation partnership project (3GPP) long term evolution (LTE) system or a LTE-advanced (LTE-A) system. However, the present technical features, aside from unique features of 3GPP LTE and LTE-A can be applied to any other mobile system.

In some instances, well-known structures and devices are omitted in order to avoid obscuring the concepts of the present invention and important functions of the structures and devices are shown in block diagram form. The same reference numbers will be used throughout the drawings to refer to the same or like parts.

In addition, in the following description, it is assumed that a user equipment (UE) refers to any mobile or fixed type device of a user side, such as a user equipment, a mobile station (MS), an advanced mobile station (AMS), etc., and that a base station (BS) refers to any node of a network side that communicates with the UE, such as a Node B, an eNode B, a base station, AP (Access Point), etc. Throughout this specification, the technical features of the present invention are described based on an institute of electrical and electronic engineers (IEEE) 802.16 system, but can be applied to various other communication systems.

In a mobile communication system, a UE may receive information from a BS in downlink and transmit information in uplink. The information transmitted or received by the UE may be data and various control information. In addition, there are various physical channels according to the type or use of the information transmitted or received by the UE.

The following technical features can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communication (GSM)/general packet radio service (GPRS)/enhanced data rates for GSM evolution (EDGE), etc. OFDMA may be embodied through radio technology such as IEEE 802.11 (Wi-Fi), IEEE 802.16 (WiMAX), IEEE 802-20, evolved UTRA (E-UTRA), and the like. UTRA is a part of a universal mobile telecommunications system (UMTS). 3GPP LTE is a part of evolved UMTS (E-UMTS), which uses E-UTRA. The 3GPP LTE employs OFDMA in downlink and employs SC-FDMA in uplink. LTE advanced (LTE-A) is an evolved version of 3GPP LTE.

Specific terms used in the embodiments of the present invention are provided to aid in the understanding of the present invention. These specific terms may be replaced with other terms within the scope and spirit of the present invention.

Figure 1:
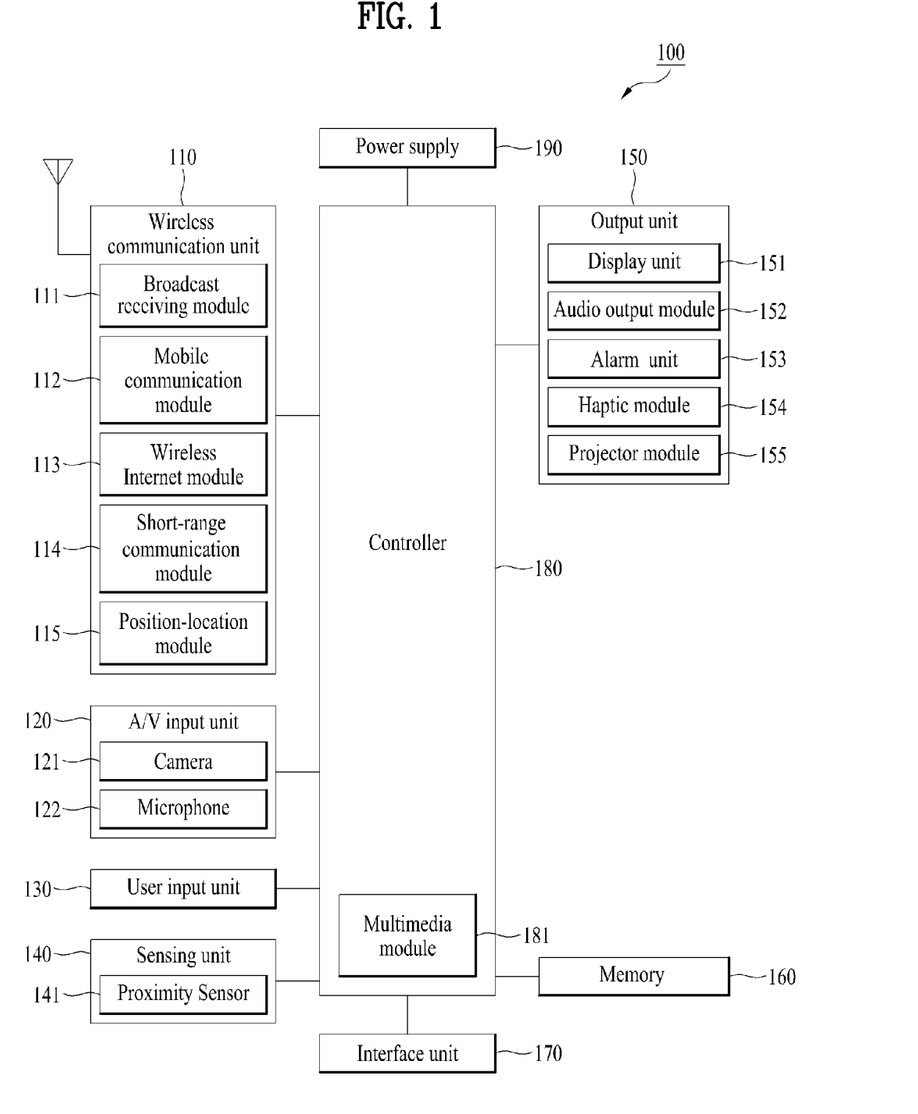
FIG. 1 is a schematic block diagram of a structure of a user equipment (UE) according to the present invention.

FIG. 1 is a schematic block diagram of a structure of a UE 100 according to the present invention.

Throughout this specification, a UE is not limited to a cellular phone as a telephone illustrated in the FIG. 1 and can be broadly applied to a smart phone, a notebook computer, a digital broadcast terminal, a personal digital assistant (PDA), a portable multimedia player (PMP) a navigation device, and the like. Thus, it can be understood that the UE includes any portable electronic product. The UE 100 may include a wireless communication unit 110, an audio/video (A/V) input unit 120, a user input unit 130, a sensing unit 140, an output unit 150, a memory 160, an interface unit 170, a controller 180, a power supply unit 190, etc. When these components are embodied in actual applications, two or more components are combined to constitute one component or one component is divided into two or more components, as necessary.

Hereinafter, these components will be sequentially described.

The UE 100 may include the wireless communication unit 110, the A/V input unit 120, the user input unit 130, the sensing unit 140, the output unit 150, the memory 160, the interface unit 170, the controller 180, the power supply unit 190, etc. The components illustrated in FIG. 1 are not required. Thus, greater or fewer components than in FIG. 1 may constitute the UE 100.

Hereinafter, these components will be sequentially described.

The wireless communication unit 110 may include one or more modules that can allow wireless communication between the UE 100 and a wireless communication system or between the UE 100 and a network in which the UE 100 is located. For example, the wireless communication unit 110 may include a broadcast receiving module 111, a mobile communication module 112, a wireless Internet module 113, a short range communication module 114, a location information module 115, etc.

The broadcast receiving module 111 receives a broadcast signal and/or broadcast related information from an external broadcast management server through a broadcast channel. The broadcast channel may include a satellite channel and a terrestrial channel. The broadcast management server may refer to a server that generates and transmits a broadcast signal and/or broadcast related information or a server that receives a pre-generated broadcast signal and/or broadcast related information and transmits the pre-generated broadcast signal and/or broadcast related information to a UE. The broadcast signal may include a broadcast signal formed by adding a data broadcast signal to a television (TV) broadcast signal or a radio broadcast signal as well as a TV broadcast signal, a radio broadcast signal, and a data broadcast signal.

The broadcast related information may refer to information regarding a broadcast channel, a broadcast program, or a broadcast service provider. The broadcast related information may be provided through a mobile communication network. In this case, the broadcast related information may be received by the mobile communication module 112.

A variety of types of broadcast related information may be present. For example, the broadcast related information may be present in the form of electronic program guide (EPG) of digital multimedia broadcasting (DMB), electronic service guide (ESG) of digital video broadcast-handheld (DVB-H), or the like.

The broadcast receiving module 111 may receive a digital broadcast signal using a digital broadcast system, for example, digital multimedia broadcasting-terrestrial (DMB-T), digital multimedia broadcasting-satellite (DMB-S), media forward link only (MediaFLO), digital video broadcast-handheld (DVB-H), DVB-CBMS, OMA-BCAST, integrated services digital broadcast-terrestrial (ISDB-T), etc. Of course, the broadcast receiving module 111 may be adapted to other broadcast systems as well as the aforementioned digital broadcast system.

The broadcast signal and/or broadcast related information received by the broadcast receiving module 111 may be stored in the memory 160.

The mobile communication module 112 transmits and receives a wireless signal to and from at least one of a BS, an external UE, and a server on a mobile communication network. The wireless signal may include a voice call signal, a video telephony call signal, and/or data in various forms according to transmission and reception of text/multimedia messages. The wireless Internet module 113 may refer to a module for wireless Internet access and may be installed internally or externally on the UE 100. As a wireless Internet technology, wireless LAN (WLAN) (Wi-Fi), wireless broadband (Wibro), world interoperability for microwave access (Wimax), high speed downlink packet access (HSDPA), etc. may be used.

The short range communication module 114 refers to a module for short range communication. As short range communication technologies, Bluetooth, radio frequency identification (RFID), infrared data association (IrDA), ultra wideband (UWB), ZigBee, etc. may be used.

The location information module 115 is a module for acquisition of location information of a UE. A representative example of the location information module 115 may include a global positioning system (GPS) module and an inertial sensor. According to current technologies, the GPS module may calculate information regarding distances from three or more modules and accurate time information and apply trigonometry to the calculated information to accurately calculate current location information according to latitude, longitude, and altitude. Currently, a method of calculating location and time information using three satellites and calibrating errors of the calculated position and time information using another satellite has been extensively used. In addition, the GPS module may continuously calculate a current location in real time to calculate velocity information. The inertial sensor calculates a relative location value by measuring a movement distance at a reference point using an accelerometer and by measuring a movement direction using a gyroscope. The inertial sensor will be described in more detail.

Referring to FIG. 1, the A/V input unit 120 is used to input an audio signal or a video signal and may include a camera 121 and a microphone 122. The camera 121 processes image frames of still images or moving pictures obtained by an image sensor in a video telephony mode or a photograph mode. The processed image frames may be displayed by a display unit 151. The image frames processed by the camera 121 may be stored in the memory 160 or externally transmitted through the wireless communication unit 110. The UE 100 may include two or more cameras 122 according to service environment.

The microphone 122 receives an external audio signal in a call mode, a recording mode, a voice recognition mode, or the like and processes the received audio signal into electrical voice data. In the call mode, the processed voice data is converted into a form in which the data can be transmitted to a mobile communication BS through the mobile communication module 112 and output. The microphone 122 may employ various noise removal algorithms for removal of noise generated when the external audio signal is received.

The user input unit 130 generates input data for control of an operation of the UE 100 from a user. The user input unit 130 may receive a signal indicating two or more content items among displayed content items, according to the present invention. In addition, the signal indicating the two or more content items may be received through touch input or hard and soft key input. The user input unit 130 may receive input for selection of one or two or more content items from the user. In addition, the user input unit 130 may receive input for generation of an icon related to a function performed by the UE 100. The user input unit 130 may include a direction key, a key pad, a dome switch, a touch pad (constant voltage/capacitance), a jog wheel, a jog switch, and so on.

The sensing unit 140 may sense a current state of the UE 100 such as an open/close state of the UE 100, a location of the UE 100, whether a user touches the UE 100, a direction of the UE 100, and acceleration/deceleration of the UE 100 to generate a sensing signal for control of the operation of the UE 100. For example, when the UE 100 is a slide phone, the sensing unit 140 may sense whether the slide phone is opened or closed. In addition, the sensing unit 140 may sense whether the power supply unit 190 supplies power and whether the interface unit 170 is connected to an external device. The sensing unit 140 may include a proximity sensor 141. The proximity sensor 141 will be described below with regard to a touchscreen.

The output unit 150 may generate visual, auditory, or tactile output and may include the display unit 151, an audio output module 152, an alarm unit 153, a haptic module 154, and a projector module 155. The display unit 151 may display (output) information processed by the UE 100. For example, when the UE 100 is in a call mode, the display unit 151 displays a user interface (UI) or a graphical user interface (GUI) related to a telephone call. When the UE 100 is in a video telephony mode or a photograph mode, the display unit 151 displays a captured and/or received image, a UI, or a GUI. The display unit 151 may include at least one of a liquid crystal display (LCD), a thin film transistor-liquid crystal display (TFT LCD), an organic light-emitting diode (OLED), a flexible display, and a three-dimensional (3D) display. Among these, some displays may be a transparent type or a light transmission type display such that a user can view an object behind the display therethrough. In this case, these displays may be called a transparent display. A representative example of the transparent display may include a transparent OLED (TOLED) and the like. The display unit 151 may be configured to have a rear structure or a light transmission structure. Due to these structures, the user can view an object located behind a body of the UE 100 through a transparent area of the body of the UE 100, which is occupied by the display unit 151. The UE 100 may include two or more display units 151 according to an embodiment type of the UE 100. For example, the UE 100 may include a plurality of display units that are arranged or integrated on one surface at a predetermined distance or arranged on different surfaces. When the display unit 151 and a sensor (hereinafter, referred to as a 'touch sensor') for detection of a touch operation form a layered structure (hereinafter, referred to as a 'touchscreen'), the display unit 151 may be used as an input device as well as an output device. For example, the touch sensor may be in the form of a touch film, a touch sheet, a touch pad, and so on.

The touch sensor may convert variation in pressure applied to a specific portion of the display unit 151 or variation in capacitance generated at a specific portion of the display unit 151 into an electrical input signal. The touch sensor may sense pressure of touch as well as a location and area of the touch. When touch input to the touch sensor is present, a signal (signals) corresponding to the touch input is transmitted to a touch controller (not shown). The touch controller processes the signal (signals) and then transmits data corresponding to the processed signal to the controller 180. Thus, the controller 180 may recognize a touched portion of the display unit 151.

The proximity sensor 141 may be disposed in an internal region of the UE 100, surrounded by the touchscreen, or near the touchscreen. The proximity sensor 141 refers to a sensor that senses an object approaching a predetermined sensing surface or an object located near the proximity sensor 141 using an electromagnetic force or infrared rays without having mechanical contact. The proximity sensor 141 may have a longer lifetime than a contact sensor, thus having a wider range of applications. An example of the proximity sensor 141 may include a transmission type photoelectric sensor, a direct reflection type photoelectric sensor, a mirror reflection type photoelectric sensor, a high-frequency oscillating proximity sensor, a capacitive proximity sensor, a magnetic proximity sensor, an infrared proximity sensor, etc. When the touchscreen is of a capacitance type, the proximity sensor 141 may be configured to detect proximity of a pointer through variation in an electric field according to proximity of the pointer. In this case, the touchscreen (or a touch sensor) may be classified as a proximity sensor. Hereinafter, for convenience of description, an action of allowing recognition of presence of the pointer on the touchscreen via the pointer approaching the touchscreen without actually touching the touchscreen will be referred to a "proximity touch" and an action of actually bringing the pointer into contact with the touchscreen will be referred to a "contact touch". In this case, a point at which the proximity touch occurs corresponds to a point of the touchscreen, in which the point is imaginarily projected during the proximity touch. The proximity sensor 141 senses the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touchscreen.

The audio output module 152 may output audio data received from the wireless communication unit 110 or stored in the memory 160 in a call signal receiving mode, a telephone call mode, a recording mode, a voice recognition mode, or a broadcasting receiving mode. The audio output module 152 may output audio signals related to functions (e.g., a ringtone, a message tone, etc.) performed by the UE 100. The audio output module 152 may include a receiver, a speaker, a buzzer, etc.

The alarm unit 153 outputs a signal indicating generation of an event of the UE 100. For example, alarms may be generated upon receiving a call signal, receiving a message, inputting a key signal, inputting touch, etc. The alarm unit 153 may also output signals in forms different from video signals or audio signals, for example, a signal for indicating generation of an event may be generated through vibration. The video signals or the audio signals may also be output through the display unit 151 or the audio output module 152. Thus, the display unit 151 and the audio output module 152 may be classified as a type of the alarm unit 153.

The haptic module 154 generates various haptic effects that the user can feel. A representative example of the haptic effect generated by the haptic module 154 is vibration. An intensity and pattern of vibration generated by the haptic module 154 may also be controlled. For example, different vibrations may be combined and output or can be sequentially output.

The haptic module 154 may generate a variety of haptic effects including an effect of stimulus according to arrangement of pins vertically moving against a contact skin surface, an effect of stimulus according to a jet force or suction force of air through a jet hole or a sucking suction hole, an effect of stimulus of rubbing the skin, an effect of stimulus according to contact of an electrode, an effect of stimulus using an electrostatic force, and an effect according to a reproduction of cold and warmth using an element that can absorb or radiate heat as well as vibrations. The haptic module 154 may not only transmit haptic effects through direct contact but may also allow the user to feel haptic effects through a kinesthetic sense of the user's fingers or arms. The UE 100 may include two or more haptic modules 154 according to an embodiment type of the UE 100. The projector module 155 performs a function of projecting an image using the UE 100 and may display an image, which is the same as or partially different from an image displayed on the display unit 151, on an external screen or a wall according to a control signal of the controller 180.

In detail, the projector module 155 may include a light source (not shown) for generating light (e.g., a laser beam) for externally outputting an image, an image generator (not shown) for generating an image to be externally output using the light generated by the light source, and a lens (not shown) for enlarging and externally outputting an image from a predetermined focal distance. In addition, the projector module 155 may include a device (not shown) for mechanically moving the lens or the projection module 155 to adjust an image projection direction. The projector module 155 may be classified into a cathode ray tube (CRT) module, a liquid crystal display (LCD) module, a digital light processing (DLP) module, and so on according to a display device type. In particular, the DLP module uses a method of enlarging and projecting an image generated by reflecting the light generated by the light source by a digital micromirror device (DMD) chip, and may be advantageous in terms of miniaturization of the projector module 155. Preferably, the projector module 155 may be installed on a lateral surface, a front surface, or a rear surface of the UE 100 in a longitudinal direction thereof. Of course, the projector module 155 may be installed at any location of the UE 100 as necessary.

The memory 160 may store a program for processes and control of the controller 180 and may temporally store input/output data (e.g., phone book, messages, audio, still images, moving pictures, etc.). The memory 160 may also store frequency of use of each data (e.g., frequency of use of each telephone number, each message, and each multimedia). In addition, the memory 160 may store data about vibration and sounds in various patterns that are output when touch input is applied to the touchscreen.

The memory 160 may include at least one of storage media such as a flash memory, a hard disk type memory, a multimedia card micro type memory, a card type memory (e.g., an SD or XD memory), a random access memory (RAM), a static random access memory (SRAM), a read-only memory (ROM), an electrically erasable programmable read-only memory (EEPROM), a programmable read-only memory (PROM), magnetic memory, a magnetic disk, and an optical disk. The UE 100 may also operate in relation to a web storage that performs a storing function of the memory 160 on the Internet.

The interface unit 170 may serve as a path to external devices connected to the UE 100. The interface unit 170 may receive data from the external devices or power and transmit the data or power to internal components of the UE 100 or transmit data of the UE 100 to the external devices. For example, the interface unit 170 may include a wired/wireless headset port, an external charger port, a wired/wireless data port, a memory card port, a port for connecting a device having an identification module, an audio I/O port, a video I/O port, an earphone port, etc., for example.

The identification module is a chip that stores various information for authentication of an authority of the UE 100 and may include a user identify module (UIM), a subscriber identify module (SIM), a universal subscriber identity module (USIM), etc. A device (hereinafter, referred to as an 'identification device') including the identification module may be manufactured in the form of a smart card. Thus, the identification module may be connected to the UE 100 through a port. The interface unit 170 may also be a path through which power from an external cradle is supplied to the UE 100 when the UE 100 is connected to the external cradle or a path through which various command signals input by the user through the cradle are transmitted to the UE 100. The various command signals or power input from the cradle may be used as signals for confirming whether the UE 100 is accurately set in the cradle. The controller 180 may control overall operations of the UE 100. For example, the controller 180 may perform control and processing for voice communication, data communication, video telephony, etc. The controller 180 may include a multimedia module 181 for reproduction of multimedia. The multimedia module 181 may be internally embodied in the controller 180 or separately embodied from the controller 180.

The controller 180 may perform a pattern recognition process via which handwriting input or picture-drawing input applied to the touch screen is recognized as characters or images.

The power supply unit 190 may receive external power and internal power and supply power required for operations of the components according to control of the controller 180.

Prior to the description of embodiments of the present invention, several location measurement methods will be described. First, triangulation and Wi-Fi Positioning System (WPS) (fingerprinting) is described as a location measurement method.

Figure 2:
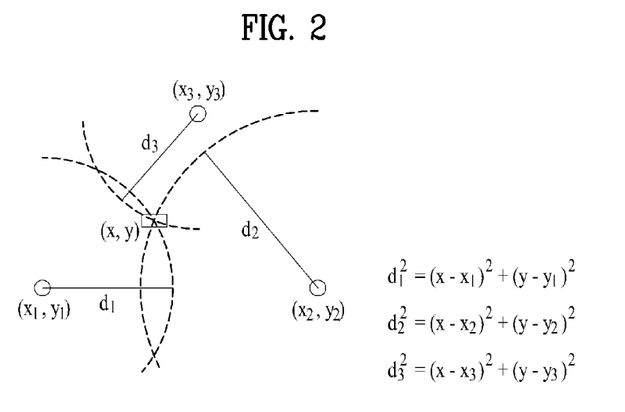
FIG. 2 is a diagram illustrating a triangulation method among several location measurement methods.

FIG. 2 is a diagram illustrating a triangulation method among several location measurement methods.

In triangulation, at least three reference points are required to estimate a real-time location of an entity and distances from the three or more reference points are calculated to detect intersections therebetween, thereby performing location estimation. Triangulation is shown in FIG. 2. Using equations shown in FIG. 2, the location (xy, yu) of the UE may be calculated using a recursive least squares (LS) method. A distance measurement method used for triangulation may be expressed as follows.

a. Received Signal Strength Indication (RSSI)

A distance between two points may be obtained using equation 1 and equation 2 as Friis's formula.

$$L = 20\log_2\left(\frac{4\pi d}{\lambda}\right)[\text{dB}] \quad \text{[Equation 1]}$$

$$d = \frac{\lambda}{4\pi}10^{\frac{L}{20}} = \frac{c}{4\pi f}10^{\frac{L}{20}} \quad \text{[Equation 2]}$$

b. Time of Arrival (ToA)

A signal transmit time between each of a plurality of APs, the locations of which are known, and a UE is measured to calculate the location of the UE. A distance between an AP and a UE may be calculated by accurate time synchronization therebetween.

Figure 3:
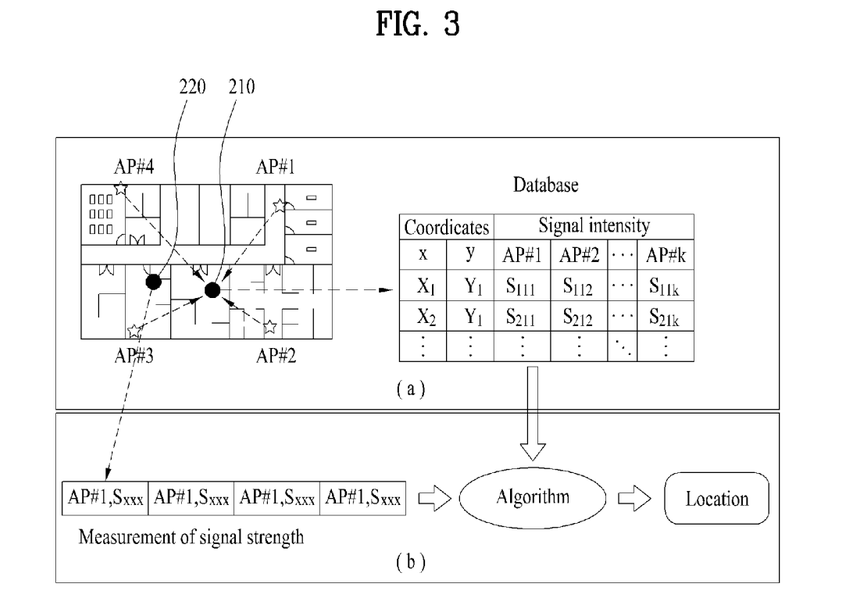
FIG. 3 is a diagram of a fingerprinting localization method in a Wi-Fi positioning system (WPS)

FIG. 3 is a diagram of a fingerprinting localization method in a WPS.

Fingerprinting is a method based on empirical data, in which an area which is subjected to localization is divided into regions in the cell form or various forms, values of signals transmitted from access points (APs) are measured at the reference points of the regions and are stored in the form of a database. After the database of received signals is established, a signal value measured via actual localization and a value stored in the database are compared to determine location.

That is, fingerprinting may broadly include two steps. In a first step, an area which is subjected to location estimation is divided into regions in the specific form, strength of a signal of the AP is measured at the reference point of each region, and collects data based on the signal strength. In a second step, an actual location is estimated using a specific algorithm based on data stored in the form of a database and signal values transmitted from the AP, measured actually.

FIG. 3(A) is a diagram illustrating a step of collecting a signal for location estimation, in which a UE measures values of signals received from a plurality of APs: AP1, AP2, AP3, and AP4 at a specific reference point 310 and establishes a database. FIG. 3(B) illustrates a step of estimating a current location by applying strength of signals measured at a measurement point 320 and strength of signals stored in the database to an algorithm. The WPS using fingerprinting does not require time synchronization for location estimation, and multipath components according to environment are contained in the database. Thus, the WPS is advantageously able to accurately estimate an indoor location. However, the WPS is disadvantageous in that a database for a service area needs to be established and to be updated according to change in internal environment (e.g., AP movement, etc.).

Next, a machine learning algorithm will be briefly described.

The machine learning algorithm predicts what kind of new data is given by inputting given data to a computer, performing learning based on any specific algorithm and establishing a judgment criterion.

Examples of the machine learning algorithm include a support vector machine (SVM).

Figure 4:
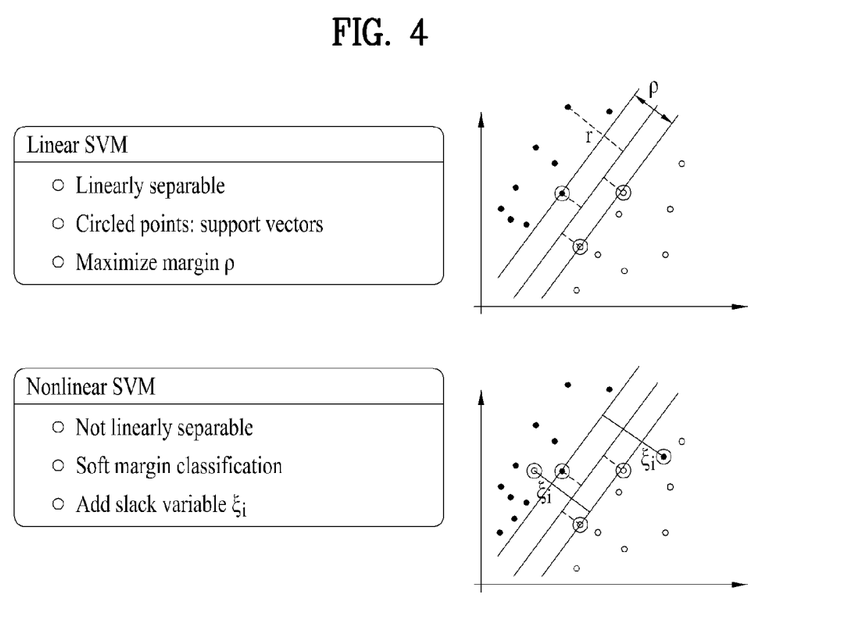
FIG. 4 is a diagram illustrating a support vector machine (SVM)

FIG. 4 is a diagram illustrating a support vector machine (SVM).

Referring to FIG. 4, the SVM is a method of classifying observed values into two categories, for the purpose of detecting an optimal hyperplane for separating given data into two groups as far as possible. Since there are many linear separation functions for separating data belonging to two categories and capable of being subjected to linear separation, the SVM includes determining which of such many separation functions is preferably selected as an optimal separation function. If a distance of an extension of a primary straight line, which is a separation function, to a data point is a margin, a hyperplane bisecting the center of a margin having a maximum size is referred to as an "optimal separating hyperplane (OSH)" and data adjoining an area forming the margin is referred to as a "support vector".

After a UE receives a signal from an AP or an AP receives a signal from a UE, the UE/AP performs localization using the received signal or information transmitted via the received signal. The signal received by the UE/AP for localization is influenced by transmission environment (e.g., scattering, delay, multipath, shadowing, line of sight (LOS)/non line of sight (NLOS) and thus localization accuracy is decreased. In order to reduce influence of such a channel environment so as to more accurately perform localization, the present invention proposes a location estimation method using a relevance vector machine (RVM) regressor. The localization method using the RVM regressor according to the present invention decreases complexity of a localization system through relative reduction in the number of vectors used for the RVM regressor and provides excellent NLOS mitigation performance, as compared to the SVM method.

Figure 5A:
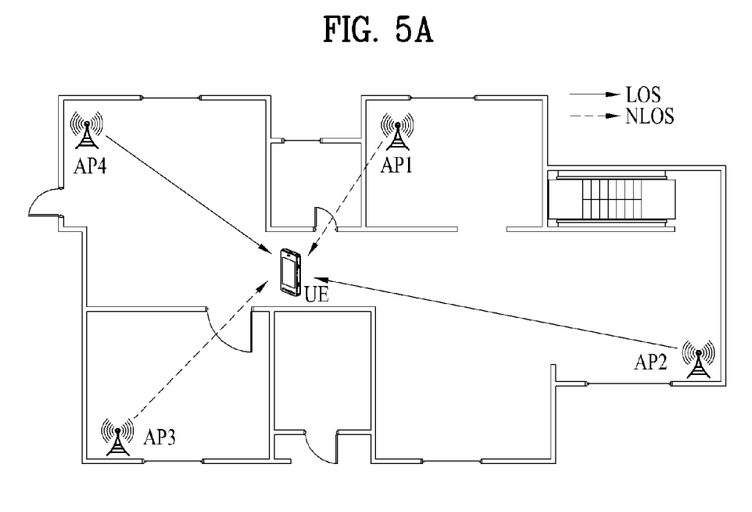
FIG. 5a is a diagram illustrating the concept of localization using a relevance vector machine (RVM) proposed by the present invention and FIG. 5b is a diagram illustrating a localization method using an RVM.
Figure 5B:
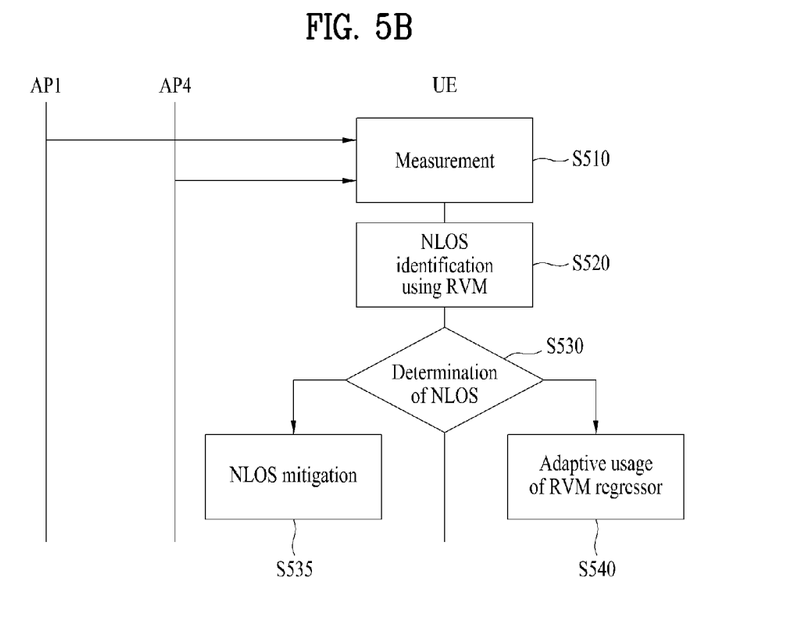

FIG. 5a is a diagram illustrating the concept of localization using an RVM proposed by the present invention and FIG. 5b is a diagram illustrating a localization method using an RVM.

As shown in FIG. 5a, the UE is in an LOS environment between AP2 and AP4 and is an NLOS environment between AP1 and AP3. The UE receives signals from peripheral APs/BSs via the LOS/NLOS environment.

Referring to FIG. 5b, the UE receives and measures signals from peripheral APs AP1, AP2, AP3 and AP4 indoors (S510). With respect to the measured signals, whether a channel environment between the UE and each AP is an LOS or NLOS environment may be determined using the RVM (S520). As shown in FIG. 5a, the signals received from AP1 and AP3 are determined to be NLOS signals (S530). The UE may identify NLOS components of the signals from the APs/BSs upon localization to improve localization accuracy. In addition, the UE may mitigate the NLOS components identified via the RVM using the RVM regressor (S530) or adaptively apply a weight factor (S540).

NLOS mitigation method using RVM

In order to perform localization indoors, the UE/AP performs training for machine learning using data acquired via the received signal. At this time, the data may be acquired before localization or after localization. For example, the data used for localization may be composed of one or more of received signal energy, mean excess delay, RMS delay spread, maximum amplitude, Kurtosis, received signal strength indication (RSSI), etc. detected via the received signal.

The UE/AP may obtain an optimized weight vector using the data used to perform localization and data features and determine whether a channel environment between the UE and the AP is an LOS environment or an NLOS environment via the RVM regressor using the optimized weight vector. Thereafter, mitigation of the NLOS component, which decreases localization accuracy, is performed using the weight vector.

In the NLOS mitigation method using the RVM, in order to determine whether a channel environment is an LOS environment or an NLOS environment, the optimized weight vector should be obtained. Hereinafter, the method of obtaining the optimized weight vector will be described.

RVM Based Ranging

The RVM is a powerful machine learning algorithm used in a variety of classification and regression applications. The RVM uses only an extremely sparse number of RVs with maintain the similar performance as other sparse machine learning algorithms. Taking an example of SVM, the RVM can overcome the SVM's limitations that the output is a deterministic value, so the uncertain nature of data is not expressed, the complexity parameter is necessary to be found by checking all possible value of SVM, and kernel function must be satisfied the semi-positive definite condition.

a) Classification: an RVM classifier of the linear form may be considered as equation 3.

$$y(x) = W^T \Phi(x) \quad \text{[Equation 3]}$$

wherein x is an input data vector with M feature elements, $W = [w_0, \ldots, w_N]^T$ is a weight vector, and $\Phi(x) = [1 \phi(x, x_1), \phi(x, x_N)]^T$ where $\phi: R^M \times R^M \rightarrow R$ is the kernel function that can be considered as general inner product between variable. We first train this RVM classifier with a training data set to obtain the optimum parameters for the RVM classifier. The RVM classifier then classifies the new input data into LOS or NLOS received signal.

The training data sets consist of the training input data $x_1$ and its target variables $\delta_i$ where $i=1, 2, \ldots N$. Note that $x_i$ is a vector with M feature elements and $\delta_i$ denotes the identification of the received signal, i.e., LOS($\delta_i = 0$) and NLOS($\delta_i = 1$). Using these training data set, the weight vector w in (1) of the RVM classifier is optimized. The distribution of the vector w is considered to be a zero-mean Gaussian prior as equation 4.

$$f_w(w) = \prod_{i=0}^{N} \frac{1}{\sqrt{2\pi\alpha_i}} \exp\left\{-\frac{w_i^2}{2\alpha_i}\right\} \quad \text{[Equation 4]}$$

where $\alpha_i$ is the variance of the (i+1)th component of W.

The posterior probability of LOS can be written as a logistic sigmoid function on y(x) as below equation 5.

$$P\{\delta(x) = 0; \Phi\} = h(y(x)) = h(W^T \phi(x)) \quad \text{[Equation 5]}$$

where $h(t) = 1/(1 + e^{-t})$ is the logistic sigmoid function.

The likelihood function for a training data $\{x_i, \delta_i\}$, $i=1, 2, \ldots, n$ can be written as equation 6.

$$f_{t|w}(\delta | w) = \prod_{i=1}^{N} h(y(x_i))^{\delta_i} [1 - h(y(x_i))]^{1-\delta_i} \quad \text{[Equation 6]}$$

Since $f_{t|\delta}(\delta|w) \propto f_{\delta|w}(\delta|w) f_w(w)$, finding the optimum w is equivalent to solving equation 7.

$$w^* = \operatorname{argmax} \sum_{i=1}^{N} [\delta_i \log \xi_i + (1 - \delta_i) \log(1 - \xi_i)] - \frac{1}{2} w^T \Lambda w \quad \text{[Equation 7]}$$

where $\xi_i = h(y(x_i))$ and $\Lambda = \operatorname{diag}(a_0, \ldots, a_N)$.

b) Regression

RVM regressor of the linear form may be designed as equation 8:

$$d(x) = \sum_{i=1}^{N} w_i \varphi(x, x_i) + w_0 \quad \text{[Equation 8]}$$

wherein y(x) is a range prediction for an input data vector x. The training data sets consist of input data $x_i$ and their output variables $d_i$ where $i=1, 2, \ldots N$. We can consider the range estimate as Gaussian random variable $d_i \sim N(y(x_i), \sigma^2))$, where $\sigma^2$ is the variance of Gaussian model. The weigh vector w with hyper parameter a is also considered to be modeled by Gaussian random a prior the same as equation 4 the RVM classifier. Using the type-II maximum likelihood (ML) as in equation 9.

$$\alpha_i^{-1} = \frac{\gamma_i}{u_i^2}, \sigma^2 = \frac{\|d - \Phi u\|^2}{N - \sum_{i=1}^{N} \gamma_i} \quad \text{[Equation 9]}$$

With these training data, the ML solutions of hyper parameters $\alpha_{ML}$ and $\sigma_{ML}$ can be obtained. With these parameters, the optimal weight vector w can be obtained.

Let $X = [x_1, \ldots, x_N]^T$ be a matrix that each column is a vector of testing features. Then, given the target ranging vector $d = [d_1, \ldots, d_N]^T$, the posteriori of w is also Gaussian as equations 10, 11 and 12.

$$f_{w|d}(w) = N_{N+1}(\mu, \Sigma) \quad \text{[Equation 10]}$$

$$\Sigma = \left(\Lambda^{-1} + \frac{1}{\sigma^2} \Phi^T \Phi\right)^{-1} \quad \text{[Equation 11]}$$

$$\mu = \frac{1}{\sigma^2} \Sigma \Phi^T d \quad \text{[Equation 12]}$$

where $\Phi$ is the N×M design matrix with elements $\Phi_{ij} = \phi(x_i, x_j)$. With these $\alpha_{ML}$ and $\sigma_{ML}$, the optimal weight vector w using equation 12 as equation 13.

$$w^* = (\sigma_{ML}^2 \Lambda_{ML}^{-1} + \Phi^T \Phi)^{-1} \Phi^T d \quad \text{[Equation 13]}$$

where $\Lambda_{ML}$ is matrix $\Lambda$ recomputed using new updated parameters. Then, for a new vector of feature x, we can predict the ranging as Gaussian random variable $d \sim N(u_D, \sigma_D^2)$ where $u_D = u^T \phi(x)$, $\sigma_D^2 = \sigma_{ML}^2 + \phi(x)^T \Sigma \phi(x)$. By using this prediction of mean and variance for localization algorithms, the localization accuracy can be significantly improved.

Below is training model.

Training Model: training data $\{x_i, d_i\}_{i=1}^N$

Gaussian prior as below equation 14

$$W \sim N_{N+1}(0, \Lambda), \Lambda = \operatorname{diag}(d_0, \ldots, d_N) \quad \text{[Equation 14]}$$

Posterior distribution as below equations 15, 16 and 17.

$$w | d \sim N_{N+1}(u, \Sigma) \quad \text{[Equation 15]}$$

$$u = 1/\phi \Sigma \Phi^T d : \Phi \in R^{N \times M} \quad \text{[Equation 16]}$$

design matrix with elements $\Phi_{ij} = \Phi(x_i, x_j)$ $$\Sigma = \left(\Lambda^{-1} + \frac{1}{\sigma^2} \Phi^T \Phi\right)^{-1} \quad \text{[Equation 17]}$$

where w is the weight vector; and $\Lambda$ is the covariance matrix of w with assumption of diagonal form. We need to find the values of $\Lambda$ using training data. Given training data d, the posterior distribution of W|d is updated with mean $\mu$ and covariance $\Sigma$, where $\sigma^2$ is the estimated variance of noise. (typo: $\Lambda=\text{diag}(d_0, \ldots, d_N) \rightarrow \Lambda=\text{diag}(a_0, \ldots, a_N)$)

Below is Type 11 Maximum Likelihood (ML).

Type II Maximum Likelihood (ML)

Known as evidence approximation to maximize the likelihood function of weight parameters as below equations 18, 19 and 20.

$$\alpha_i = \frac{g_i}{u_i^2} \quad \text{[Equation 18]}$$

$$\sigma^2 = \frac{\|\delta - \Phi u\|^2}{N - \sum_{i=1}^{N} g_i} \quad \text{[Equation 19]}$$

$$g_i = 1 - \alpha_i \Sigma ij \quad \text{[Equation 20]}$$

ML solutions of hyper parameters $\Sigma_{ML}$ and $\sigma_{ML}$ are obtained iteratively. Where $\Sigma_i$ is the ith diagonal element of $\Lambda$; and $\sigma^2$ is the variance of noise.

$$\left(\text{typo: } \sigma^2 = \frac{\|\delta - \Phi u\|^2}{N - \sum_{i=1}^{N} g_i} \rightarrow \frac{\|d - \Phi u\|^2}{N - \sum_{i=1}^{N} g_i}, \alpha_i \rightarrow \alpha_i^{-1}\right)$$

Below is Optimal w*

Optimal w* as equation 21

$$w^* = (\sigma_{ML}^2 \Lambda_{ML} + \Phi^T \Phi)^{-1} \Phi^T d \quad \text{[Equation 21]}$$

Sequential sparse Bayesian learning algorithm can be used to significantly reduce the computational complexity. For a new input vector x, the output prediction is Gaussian as equation 22.

$$N(\hat{d}(x)) = u^T \Phi(x), \sigma^2 = \sigma_{ML}^2 + \Phi(x)^T \Sigma \Phi(X)) \quad \text{[Equation 22]}$$

For example, if localization using Wi-Fi is performed using the RVM regressor in an indoor environment, location estimation is performed as follows.

The UE which performs localization receives signals or beacon signals broadcast from APs and accumulates RSSI data or transmits a request signal, receives a response signal from the APs and accumulates RSSI data for the APs, in order to utilize the RVM algorithm upon localization.

Thereafter, the UE sets an optimized weight vector for determining the LOS/NLOS via the RVM using the stored RSSI data. Upon localization using the set weight vector, the RVM regressor is applied to the measured RSSI from the APs to perform localization in a state of excluding the AP for transmitting the signal of the NLOS component among the signals received by the UE or to decrease a weight applied to the signal having the NLOS component, which is transmitted from the AP, to perform localization. According to the number of APs having the LOS components among the APs measured by the UE, whether the AP, which transmits the signal having the NLOS component, is excluded or the weight is applied may be determined. The weight applied to the signal having the NLOS component, which is transmitted from the AP, may differ between APs according to the NLOS degree.

The weight is applied to the signal having the NLOS component, which is transmitted from the AP, using the RVM or the signal having the NLOS component, which is transmitted from the AP, is excluded upon localization and localization is performed using only the signals having the LOS component, which is transmitted from the AP, thereby more accurately measuring the location of the UE indoors.

RVM-VMP (variational message passing) cooperative localization.

In order to perform localization, the UE needs to receive signals from at least three APs. However, the number of APs from which the UE receives the signals may be less than 3 according to localization environment. In this case, localization of the UE is performed using a VMP algorithm via RVM regression, as will be described with reference to FIG. 6.

Figure 6:
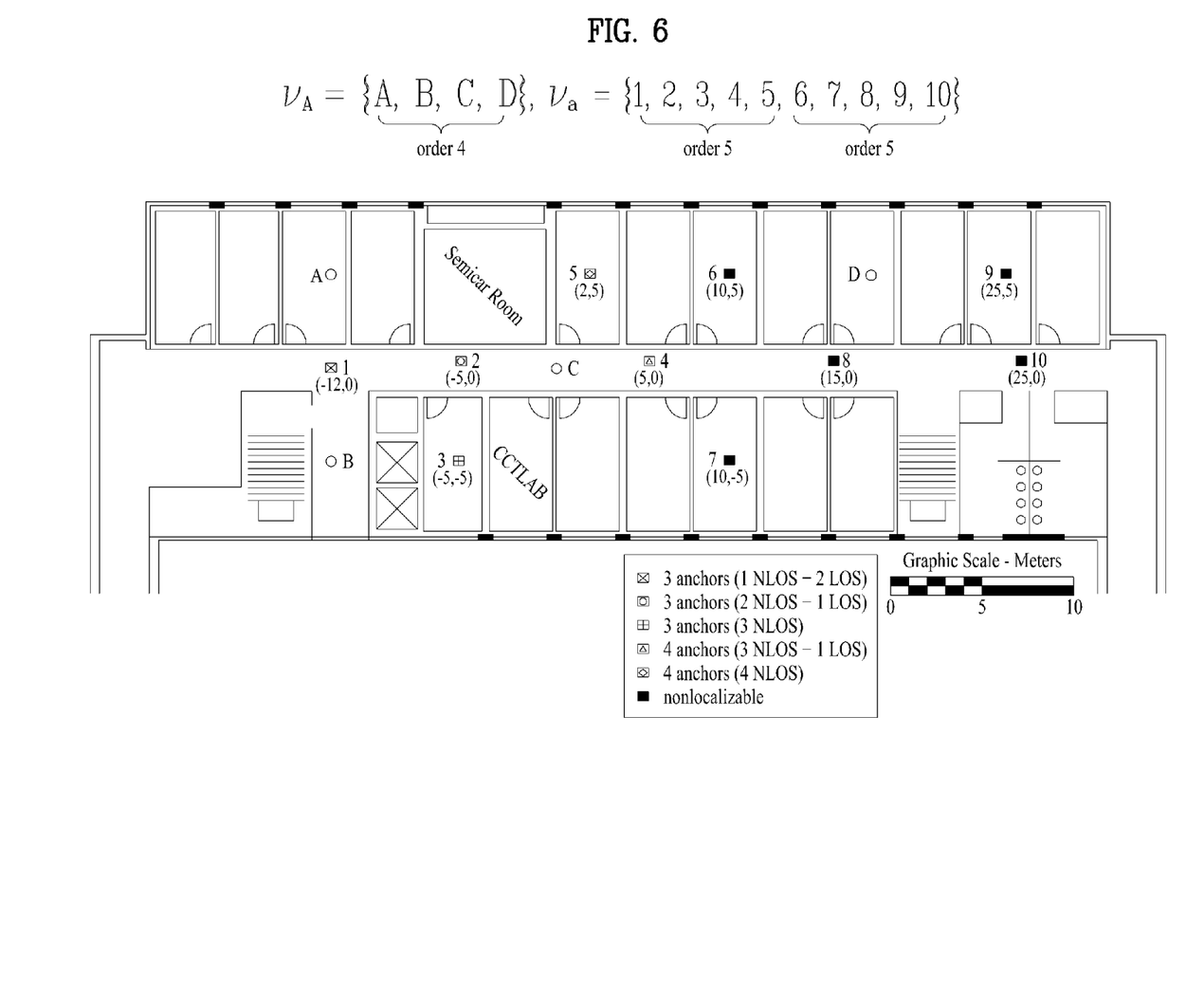
FIG. 6 is a diagram illustrating an RVM-VMP cooperative localization method proposed by the present invention.

FIG. 6 is a diagram illustrating an RVM-VMP cooperative localization method proposed by the present invention.

FIG. 6 shows the locations of APs and UEs indoors. As shown in FIG. 6, the UEs 1, 2, 3, 4, 5, 6, 7, 8, 9 and 10 receive signals from peripheral APs A, B, C and D. At this time, a channel environment between the APs and the UEs is an LOS or NLOS environment. A UE satisfying a localization condition may be present and a UE, localization of which is impossible due to an insufficient number of APs, may be present. The location of the UE, localization of which is impossible due to an insufficient number of APs, may be estimated using the RVM-VMP cooperative localization method.

For cooperative localization, each UE applies data (e.g., RSSI) acquired using signals (e.g., a beacon frame and a probe response signal) received from the APs to an RVM algorithm in order to consider a channel state between the UE and the AP, thereby obtaining a weight vector.

The UE acquires calibration information of the location thereof via the RVM regressor to which the obtained weight vector is applied. At this time, the UE calculates statistical information (e.g., position mean and position variation) of the position via the calibration information. The UE, which obtains the mean information and the variation information of the location information via the above process, may receive location information (position mean, position deviation (i.e., variation)) transmitted by the peripheral UEs via a common channel or dedicated channel set for signal transmission and reception between UEs.

The UE may update the location information thereof using the location information of the UE, the location information transmitted by the peripheral UE and ranging information between UEs. The UE, which updates the location information thereof using the location information received from the peripheral UEs, broadcasts the updated location information (mean and variation) to the peripheral UEs via the common channel.

The common channel used to transmit and receive the location information between UEs is composed of an Rx channel for receiving a signal from the peripheral UEs and a Tx channel for transmitting information thereof. In addition, the same regions/resources are allocated regardless of basic service set (BSS)/AP, such that UEs within a range transmit and receive signals.

Since the UE receives the location information from the peripheral UEs for localization, it is possible to perform localization with respect to the UEs, localization of which is impossible due to a small number of detected APs/BSs. In addition, the location information of the UEs is not fixed but the position mean and variation/deviation are used, thereby reducing localization errors. The UE, which cannot be subjected to location estimation, receives statistical information (position mean and position variance) of the measured location from the peripheral UEs via cooperation with the peripheral UEs, such that the location of the UE may be estimated using the location information measured via the information received from the AP/BS and the information about the peripheral UEs.

In addition, a common control (or data) channel/common region for transmitting statistical location information between UEs may be set to facilitate signal transmission and reception between UEs. Information about the common region may be broadcast from the AP/BS to the UE or may be set via higher layer signaling.

Hereinafter, the VMP algorithm used for the RVM-VMP cooperative localization will be described.

VMP Algorithm

The Bayesian inference is the inference methodology in which Bayes' law is user to update the probability estimate for hypothesis as additional evidence is learned.

Let $Z=[z_1 \ z_2 \ \ldots \ z_m]$ and $X=[x_1 \ x_2 \ \ldots \ x_m]$ which are denote a set of evidence variable (observable variables) and a set of latent variables and/or unknown parameters (hidden variables), respectively. Our goal is to update knowledge of the state of a set of hidden variables when the evidence variables are observed.

The cooperative localization algorithm can be mathematically modeled by a factor graph with vertexes and edges, representing factors and variable, respectively.

Then the factor graph for the cooperative localization is equation 23.

$$p(X, d) \propto \prod_{\substack{j \in v_a \\ i \in v_{\to j} \cap v_A}} p(d_{i,j} | x_i, x_j) \prod_{\substack{j \in v_a \\ i \in v_{\to j} \cap v_A}} p(d_{i,j} | x_i, x_j) \prod_{i \in v_a} p(x_i) \quad \text{[Equation 23]}$$

where $v_a$ and $v_A$ denote the set of anchors and the set of agents, respectively, $p(x_i)$ is the prior distribution; and $p(d_{i,j}|x_i, x_j)$ is the posterior distribution of distance observation.

We consider a prior message belong to the family of circular symmetric Gaussian with mean $\eta_i$ and variance $w_i^2$, which is given by equation 24.

$$u_{f_f \to x_i}(x_i) \sim CN(\eta_i, w_i^2) \propto \exp\left(-\frac{|x_i - \eta_i|^2}{w_i^2}\right) \quad \text{[Equation 24]}$$

The messages generated in anchor-to-agent and agent-to-agent communication can be respectively as equations 25 and 26.

$$u_{f_{j,i} \to x_i}(x_i) \sim N(|x_i - p_j|, \tilde{\sigma}_{j,i}^2) \propto \exp\left(-\frac{1}{2\sigma_{j,i}^2}(d_{j,i} - |x_i - p_j|)^2\right) \quad \text{[Equation 25]}$$

$$u_{f_{j,i} \to x_i}(x_i) \propto \exp\left(-\frac{1}{2\sigma_{j,i}^2}\left(d_{j,i}^2 - d_{j,i}\sigma_j\sqrt{\pi_1}\,F_1\left(-\frac{1}{2};1;-\frac{|x_i - \hat{p}_j|^2}{\sigma_j^2}\right) + |x_i - \hat{p}_j|^2 + \sigma_j^2\right)^2 |x_i - p_j|^2\right) \quad \text{[Equation 26]}$$

The proposed VMP-based cooperative algorithm solve the mean and variance which are have minimum variational free energy. This problem can be presented as below equation 27.

$$(\hat{p}_i, \hat{\sigma}_i)_* = \operatorname{argmin}_{a \in C, \gamma \in R_{i,j}} \Bigg[ -2\ln\gamma + \frac{1}{w_i^2}(\|a_i - \eta_i\|^2 + \gamma^2|) + \sum_{j \in V_{\to f} \cap V_A} \frac{1}{2\sigma_{j,i}^2}\bigg(|p_j - a|^2 + \gamma^2 - d_{j,i}\gamma\sqrt{\pi_1}\,F_1\left(-\frac{1}{2};1;-\frac{|p_j - a|^2}{\gamma^2}\right)\bigg) + \sum_{j \in V_{\to f} \cap V_A} \frac{1}{2\sigma_{j,i}^2}(|p_j - a|^2 + \gamma^2) - \frac{d_{j,i}\sigma_j\sqrt{\pi}}{\sigma_{j,i}^2 \gamma^2} e^{-|p_j - a|^2/\gamma^2} \times \int_0^\infty r e^{-r^2/\gamma^2} I_0\left(\frac{2|\hat{p}_j - a|}{\gamma^2}r_1\right) F_1\left(-\frac{1}{2};1;\frac{r^2}{\sigma_i^2}\right) dr \Bigg] \quad \text{[Equation 27]}$$

Due to the constraint on computation of integral, the result cannot be achieved analytically in close-form, but can be computed numerically. Instead of updating mean and variance at once, we propose following two-step Gaussian belief update algorithm.

In Step 1, all nodes update their mean position using numerical evaluation.

Step 1: Positional mean update as equation 28.

$$\hat{P}_{i^*} = \operatorname{argmin}_{a \in C} p * (x_i = a) = \operatorname{argmin}_{a \in C}\Bigg[\frac{|a_i - \eta_i|^2}{w_i^2} + \sum_{j \in V_{\to f} \cap V_A} \frac{1}{2\sigma_{j,i}^2}(d_{j,i} - |a - p_j|^2) + \sum_{j \in \to f \cap V_A} \left(\frac{|a - \hat{p}_j|^2}{2\sigma_{j,i}^2} - \frac{d_{j,i}\sigma_j\sqrt{\pi}}{2\sigma_{j,i}^2} 1F_1\left(-\frac{1}{2};1;-\frac{|a - \hat{p}_j|^2}{\sigma_j^2}\right)\right)\Bigg] \quad \text{[Equation 28]}$$

Given $\hat{p}_{i*}$, cost function in step 2 is convex function. Then we can solve $\hat{\sigma}_{i*}$ efficiently through a sequence of convex feasibility problems using the bisection method.

Step 2: Positional variance update as below equation 29.

$$\hat{\sigma}_{i*} = \arg\min KL_{\gamma \in R_{ji}}(N_2(\hat{P}_{i*}) \parallel p*) \quad \text{[Equation 29]}$$

$$(x_i)) \Leftrightarrow \left[\frac{\partial KL(N_2(\hat{p}_{i*}, \gamma^2) \parallel p*(x_i))}{\partial \gamma}\right]\bigg|_{\gamma=\hat{\sigma}_{i*}} = 0$$

The proposed VMP algorithm is summarized as follows:
1. Initialization

Range distances to neighboring nodes Broadcast/collect position information to/from neighboring nodes.

2. Repeat for agent nodes and stops when update belief converges as below equation 30.

[Equation 30] A. Compute $p*(x_i)$ and $$q_*(x_i) = \arg\min_{q(x_i) \in CN} KL(q(x_i) \parallel p_*(x_i))$$

B. Broadcast $(\hat{p}_i, \hat{\sigma}_i)_*$ and collect neighboring Gaussian beliefs As described above, in the present invention, a method of mitigating an NLOS signal influencing localization by applying data measured by a UE for localization to an RVM regressor and an inter-UE cooperative localization method using the RVM regressor are utilized, thereby further improving indoor localization accuracy of the UE.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be located in combination as an embodiment of the present invention or included as a new claim by a subsequent amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of measuring a location of a user equipment (UE) located indoors in a wireless network, the method comprising:

receiving signals transmitted by a plurality of access points (APs);

performing training for machine learning using the received signals or information acquired from the received signals;

setting a weight vector to be applied to a relevance vector machine (RVM) regression using data subjected to the training for machine learning;

applying the RVM regression to the set weight vector and measured strengths of the received signals;

determining whether the signals received from the plurality of APs are line of sight (LOS) signals or non-line of sight (NLOS) signals based on the set weight vector applied to the RVM regression and the measured strengths of the received signals applied to the RVM regression;

measuring an indoor location of the UE based on the signals transmitted by the plurality of APs when a number of APs transmitting the signals is equal to or greater than three, wherein whether to exclude the determined NLOS signals or apply a weight to the determined NLOS signals for measuring the indoor location of the UE is determined based on a number of APs transmitting the LOS signals; and measuring the indoor location of the UE based on the signals transmitted by the plurality of APs and position information of other UEs when the number of APs transmitting signal is less than three.

2. The method according to claim 1, further comprising:
measuring the indoor location of the UE using only the determined LOS signals when the NLOS signals are determined to be excluded.

3. The method according to claim 1, further comprising:
applying the weight to the determined NLOS signals when the NLOS signals are determined based on the set weight vector; and measuring the indoor location of the UE using the determined NLOS signals to which the weight is applied, and the determined LOS signals.

4. The method according to claim 1, wherein the information acquired from the received signals includes at least one of received signal energy, mean excess delay, root-mean-square (RMS) delay spread (RDS), maximum amplitudes of the received signals, Kurtosis of the received signals and received signal strength indication (RSSI).

5. The method according to claim 3, wherein the weight is for mitigating the determined NLOS signals.

6. An apparatus for measuring a location of a user equipment (UE) located indoors in a wireless network, the apparatus comprising:

a wireless communication unit configured to receive signals transmitted by a plurality of access points (APs); and a controller configured to:
perform training for machine learning using the received signals or information including received signal strength indication (RSSI) acquired from the received signals, set a weight vector to be applied to a relevance vector machine (RVM) regression using data subjected to the training for machine learning, apply the RVM regression to the set weight vector and measured strengths of the received signals, determine whether the signals received from the plurality of APs are line of sight (LOS) signals or non-line of sight (NLOS) signals based on the set weight vector applied to the RVM regression and the measured strengths of the received signals applied to the RVM regression, measure an indoor location of the UE based on the signals transmitted by the plurality of APs when a number of APs transmitting the signals is equal to or greater than three, wherein whether to exclude the determined NLOS signals or apply a weight to the determined NLOS signals for measuring the indoor location of the UE is determined based on a number of APs transmitting the LOS signals, and measure the indoor location of the UE based on the signals transmitted by the plurality of APs and position information of other UEs when the number of APs transmitting signal is less than three.

7. The apparatus according to claim 6, wherein the controller is configured to measure the indoor location of the UE using only the determined LOS signals when it is determined to exclude the determined NLOS signals.

8. The apparatus according to claim 6, wherein the controller is configured to:

apply the weight to the determined NLOS signals when the NLOS signals are determined based on the set weight vector, and measure the indoor location of the UE using the determined NLOS signals to which the weight is applied, and the determined LOS signals.

9. The apparatus according to claim 6, wherein the information acquired from the received signals includes at least one of received signal energy, mean excess delay, root-mean-square (RMS) delay spread (RDS), maximum amplitudes of the received signals, Kurtosis of the received signals and received signal strength indication (RSSI).

10. The apparatus according to claim 8, wherein the weight is for mitigating the determined NLOS signals.

* * * * *